United States Patent
De Colombel

(10) Patent No.: US 10,125,737 B2
(45) Date of Patent: Nov. 13, 2018

(54) FRANCIS-TYPE RUNNER FOR A TURBINE, AND ENERGY CONVERSION PLANT COMPRISING SUCH A RUNNER

(71) Applicant: ALSTOM Renewable Technologies, Grenoble (FR)

(72) Inventor: Thomas De Colombel, Grenoble (FR)

(73) Assignee: GE RENEWABLE TECHNOLOGIES, Grenoble (FR)

( * ) Notice: Subject to any disclaimer, the term of this patent is extended or adjusted under 35 U.S.C. 154(b) by 629 days.

(21) Appl. No.: 14/741,996

(22) Filed: Jun. 17, 2015

(65) Prior Publication Data

US 2015/0285207 A1 Oct. 8, 2015

Related U.S. Application Data

(63) Continuation of application No. PCT/EP2013/077302, filed on Dec. 19, 2013.

(30) Foreign Application Priority Data

Dec. 19, 2012 (FR) ...................................... 12 62327

(51) Int. Cl.
| | | |
|---|---|---|
| *F03B 3/02* | (2006.01) | |
| *F03B 3/12* | (2006.01) | |
| *F03B 11/02* | (2006.01) | |

(52) U.S. Cl.
CPC ............... *F03B 3/125* (2013.01); *F03B 3/02* (2013.01); *F03B 3/121* (2013.01); *F03B 3/128* (2013.01);
(Continued)

(58) Field of Classification Search
CPC .. F03B 3/125; F03B 3/02; F03B 3/121; F03B 11/02; F03B 3/128; F05B 2240/30
(Continued)

(56) References Cited

U.S. PATENT DOCUMENTS

| | | |
|---|---|---|
| 4,017,211 A | 4/1977 | Alestig et al. |
| 6,135,716 A | 10/2000 | Billdal et al. |

(Continued)

FOREIGN PATENT DOCUMENTS

| | | |
|---|---|---|
| AT | 412 496 B | 3/2005 |
| CN | 1221475 A | 6/1999 |

(Continued)

OTHER PUBLICATIONS

Unofficial English Translation of Chinese Office Action issued in connection with corresponding CN Application No. 201380066888.2 on Oct. 8, 2016.

*Primary Examiner* — Christopher Verdier
*Assistant Examiner* — Jason Mikus
(74) *Attorney, Agent, or Firm* — Dority & Manning, P.A.

(57) ABSTRACT

This Francis-type runner for a turbine includes a crown, a band and blades the number of which is not a prime number. These blades are made as one piece and extend between the crown and the band, and between a leading edge and a trailing edge each trailing edge has its concave face facing upstream over its entire length. In addition, first blades are uniformly distributed about a central axis of the runner in a number equal to a divisor of the total number of blades. Each of these first blades has a point of attachment of its trailing edge to the crown that is lowered by comparison with the point of attachment of the trailing edge to the crown of second blades, which are likewise part of the runner. Moreover, the ratio between, on the one hand, the radius of a circle centered on the central axis of the runner, perpendicular to this axis and passing through the point of attachment of the trailing edge of a first blade to the crown and, on the other hand, the radius of a circle centered on the central axis of the runner perpendicular to this axis and passing through
(Continued)

the point of attachment of the trailing edge of the same blade to the band is less 0.15.

8 Claims, 3 Drawing Sheets

(52) U.S. Cl.
CPC .......... *F03B 11/02* (2013.01); *F05B 2240/30* (2013.01); *Y02E 10/223* (2013.01)

(58) Field of Classification Search
USPC ........................................................ 416/182
See application file for complete search history.

(56) References Cited

U.S. PATENT DOCUMENTS

| | | |
|---|---|---|
| 7,220,106 B2 | 5/2007 | Paquet et al. |
| 2005/0214115 A1* | 9/2005 | Keck .................... D04H 1/4374 |
| | | 415/206 |
| 2010/0086394 A1 | 4/2010 | Enomoto et al. |

FOREIGN PATENT DOCUMENTS

| | | |
|---|---|---|
| CN | 1682030 A | 10/2005 |
| DE | 202006020065 U1 | 10/2007 |
| EP | 0 930 432 A2 | 7/1999 |

* cited by examiner

FRANCIS-TYPE RUNNER FOR A TURBINE, AND ENERGY CONVERSION PLANT COMPRISING SUCH A RUNNER

CROSS-REFERENCE TO RELATED APPLICATIONS

This application claims priority to PCT/EP2013/077302 filed Dec. 19, 2013, which claims priority to French application 1262327 filed Dec. 19, 2012, both of which are hereby incorporated in their entireties.

TECHNICAL FIELD

The invention relates to a Francis-type runner for a turbine and to an energy conversion plant comprising such a runner.

BACKGROUND

Francis-type runners can be fitted to various kinds of hydraulic machines such as turbines, pumps or turbine-pumps. They comprise blades distributed about a central rotation shaft and between them defining ducts for the flow of water. The geometry of the blades of these runners is defined so that the flow of the water imparts a rotational torque to the runner when it is being used in turbine mode.

A constant preoccupation with Francis-type runners for turbines is that of controlling the flow passing through these runners and of optimizing it both for the point of best efficiency and under full and part mode conditions.

The use of roughly triangular vanes to improve the operation of a Francis-type runner is known, for example from U.S. Pat. No. 4,017,211, the vanes being fixed to the bottom part of the crown at the outlet end of the blades to divert the outlet flow from the blades to eliminate any swirling flow. This runner structure entails the addition of vanes at the crown and these may create a certain discontinuity in the flow, which make the structure of the runner more complicated, and are additional elements that have to be manufactured and assembled separately.

Another solution known from EP-A-0 930 432 is to modify all the blades of a Francis-type runner for a turbine by adding a point of inflection to their trailing edges, near the crown. This blade geometry makes it possible to relieve mechanical stresses on the runner but leads to a discontinuity in the flow downstream of the runner. Furthermore, this blade structure may present problems with fitting all the blades on the crown of the runner because the points of attachment of the trailing edges of all the blades to the crown are concentrated into a small area.

It is these disadvantages that the invention more particularly seeks to overcome by proposing a new Francis-type runner for a turbine, the flow of which is optimized, both at the point of greatest efficiency and under full and part load conditions, without the addition of additional components and without giving rise to particular problems of fitting into a given space.

SUMMARY

To this end, the invention relates to a Francis-type runner for a turbine, this runner comprising a crown, a band and blades, the number of which is not a prime number, which are made as one piece and extend between the crown and the band and between a leading edge and a trailing edge, each trailing edge having its concave face facing upstream over its entire length. According to the invention, first blades, uniformly distributed about a central axis of the runner and equal in number to a divisor of the total number of blades, have a point of attachment of their trailing edge to the crown which is lowered in comparison with the point of attachment of the trailing edge to the crown of second blades, whereas the ratio between, on the one hand, the radius of a circle centered on the central axis of the runner, perpendicular to this axis and passing through the point of attachment of the trailing edge of a first blade to the crown, and, on the other hand, the radius of a circle centered on the central axis of the runner, perpendicular to this axis and passing through the point of attachment of the trailing edge of the same blade to the band, is less than 0.15.

By virtue of the invention, the presence of the first blades allows the flow to be guided in the central part leaving the blades of the runner without the use of added elements that could create a discontinuity. The flow can thus be optimized and the pressure of any surge that may occur on the outlet side of the runner can be reduced, thus improving turbine efficiency. Furthermore, the fact that the runner is made up of first blades and also of second blades make the operation of welding the blades to the crown easier. The proportion of solid elements at the center of the runner is not too great, and this encourages the guidance of water in the central part on the outlet side of the blades.

According to advantageous but non-compulsory aspects of the invention, such a Francis-type runner may incorporate one or more of the following features, considered in any technically permissible combination:

- The ratio between, on the one hand, the radius of the circle centered on the central axis of the runner, perpendicular to this axis and passing through the point of attachment of the trailing edge of a first blade to the crown and, on the other hand, the radius of the circle centered on the central axis of the runner, perpendicular to this axis and passing through the point of attachment of the trailing edge of the same blade to the band is less than 0.1 and preferably less than 0.05.
- The ratio between, on the one hand, the radius of the circle centered on the central axis of the runner, perpendicular to this axis and passing through the point of attachment of the trailing edge of a first blade to the crown and, on the other hand, the radius of the circle centered on the central axis of the runner, perpendicular to this axis and passing through the point of attachment of the trailing edge of a second blade to the crown is less than 0.75 and preferably comprised between 0.25 and 0.50.
- The points of attachment of the trailing edges to the band of all the blades lie on one and the same circle centered on the central axis of the runner and perpendicular to this axis.
- The ratio between the area of a lateral surface of a first blade and the area of a lateral surface of a second blade is comprised between 1.05 and 1.50 and preferably between 1.20 and 1.50 and more preferably still, is of the order of 1.30.
- The periodicity of the first blades about the central axis is higher than the periodicity of the second blades, and preferably at least twice as high.
- The periodicity of the total number of blades is $2\pi/15$ and the periodicity of the number of first blades is $2\pi/3$ or $2\pi/5$. As an alternative, the periodicity of the total number of blades is $2\pi/12$ and the periodicity of the number of first blades is $2\pi/3$ or $2\pi/4$.

The invention also relates to a plant for converting hydraulic energy into electrical or mechanical energy comprising a turbine equipped with a runner as mentioned hereinabove.

BRIEF DESCRIPTION OF THE DRAWINGS

The invention will be better understood and other advantages thereof will become more clearly apparent from the following description of one embodiment of a Francis turbine runner and of an installation both in accordance with its principle, given solely by way of example and made with reference to the attached drawings in which.

DETAILED DESCRIPTION

Figure 1:
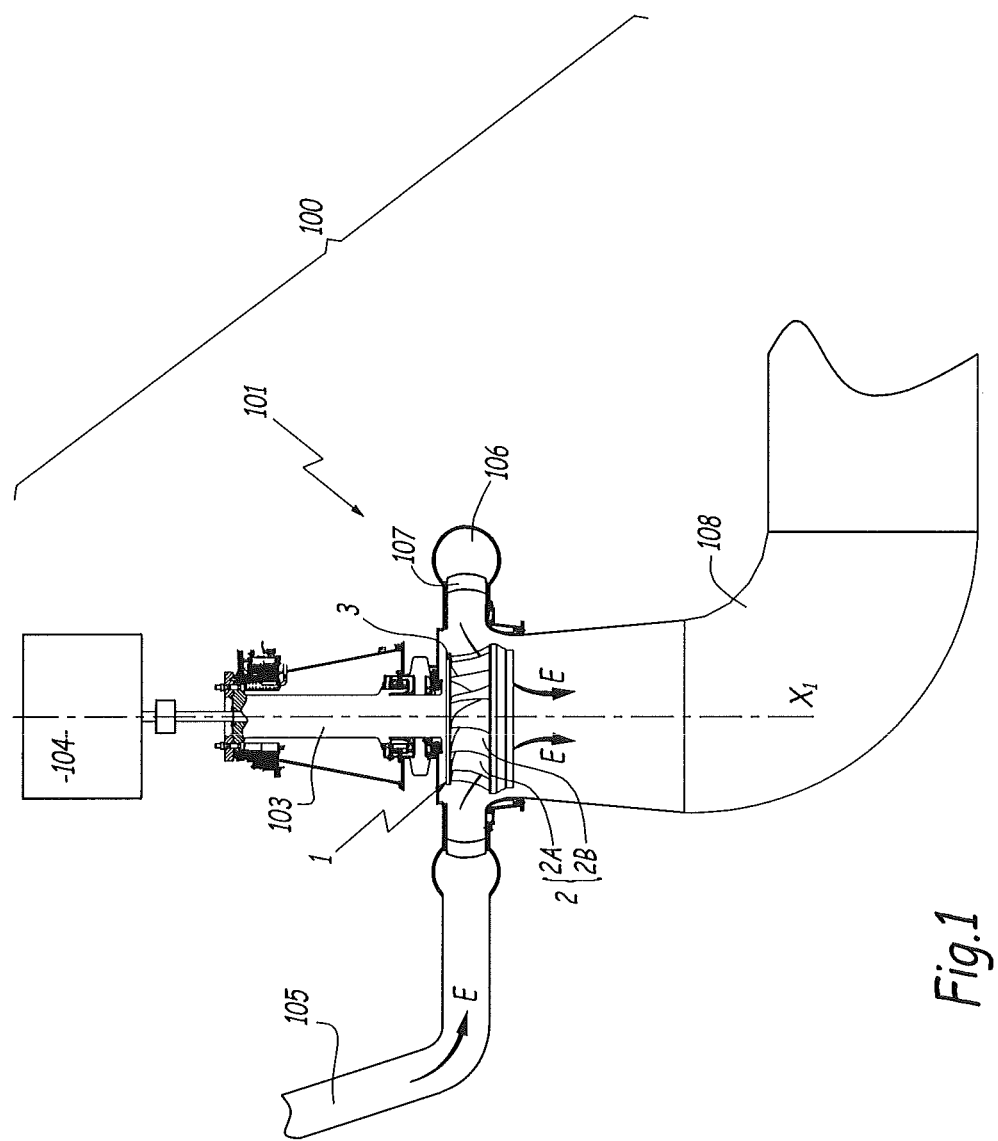
FIG. 1 is a schematic diagram, in axial section, of a plant according to the invention.

The plant 100 depicted in FIG. 1 comprises a Francis-type turbine 101 the runner 1 of which is intended to be set in rotation about a vertical axis $X_1$ by a forced flow of water E from a water catchment not depicted. In FIG. 1, for the clarity of the drawing, the runner 1 is depicted as viewed from the outside. A shaft 103 supports the runner 1 and is coupled to an alternator 104 which delivers an alternating current to a grid, not depicted. The plant therefore allows the hydraulic energy of the flow E to be converted into electrical energy.

The plant 100 may comprise several turbines 101 fed from the same water catchment.

As an alternative, the shaft 103 may be coupled to a mechanical assembly, in which case the plant 100 converts the hydraulic energy of the flow E into mechanical energy.

As an alternative, the turbine 101 is a turbine-pump, in which case it may also operate in pump mode, i.e. in a mode in which the runner 1 is turned by the alternator 104 in the opposite direction of rotation to the direction in which it rotates when the turbine-pump is operating in turbine mode. In pump mode, the alternator 104 then acts as a motor, to displace a quantity of water to the water catchment which has not been depicted. The water then flows in the opposite direction to the arrows E in FIG. 1. In the alternative form in which the shaft 103 is coupled to a mechanical assembly and the turbine 101 is a turbine-pump operating in pump mode, the runner 1 is driven by this mechanical assembly.

A penstock 105 conveys the flow E to the runner 1 when the turbine-pump is operating in turbine mode. The penstock 105 extends between the water catchment and a tank 106 equipped with wicket gates 107 which regulate the flow E. A draft tube 108 is provided downstream of the turbine in the direction of the flow E to discharge this flow and return it to the bed of a stream, a river or a reservoir downstream.

Figure 2:
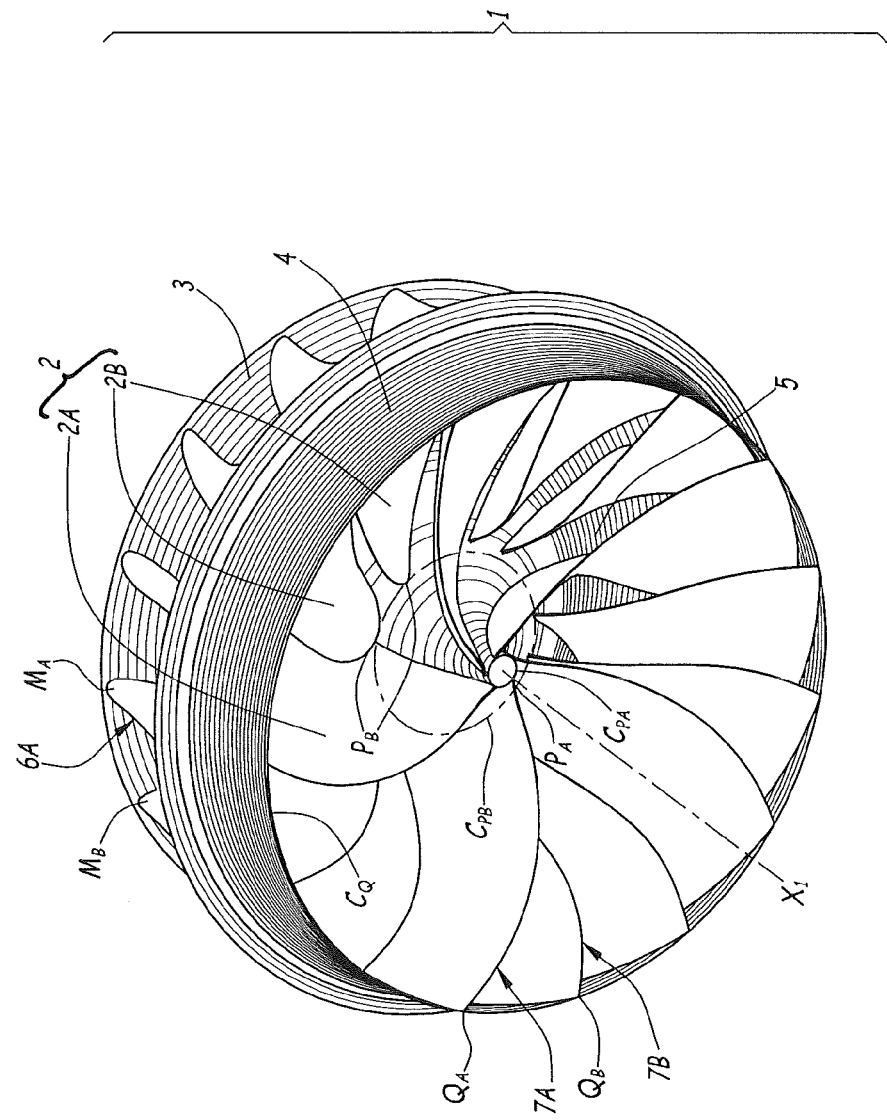
FIG. 2 is a perspective view from beneath of the Francis turbine runner of the plant of FIG. 1, this runner being a runner according to the invention.

The runner 1 depicted in FIG. 1 comprises blades 2 distributed about the central axis $X_1$ of rotation of the runner 1. A crown 3 is provided in the internal radial upper part of the runner 1, whereas a band 4 borders the lower, radial and external part of the blades 2. A flow duct 5 is thus defined between each pair of two adjacent blades 2, this duct being bordered by the crown 3 and the band 4. The total number of blades 2 of the runner 1 depicted in FIGS. 1, 2 and 3 is fifteen, with the knowledge that there could be a different total number of blades, not a prime number, such as 12, 18 or 24 blades.

The blades 2 are of two kinds, namely first blades 2A and second blades 2B. The number of first blades 2A is a divisor of the total number of blades 2, as likewise the number of second blades 2B is a divisor of the total number of blades 2. The blades 2A are identical to one another, as are the blades 2B. The blades 2A and 2B are uniformly distributed about the axis $X_1$, something made possible by the fact that the number of blades 2A and 2B can be divided into the total number of blades.

In the example, the runner 1 comprises five first blades 2A and ten second blades 2B, with a succession of like groups each comprising one first blade 2A and two second blades 2B.

Figure 3:
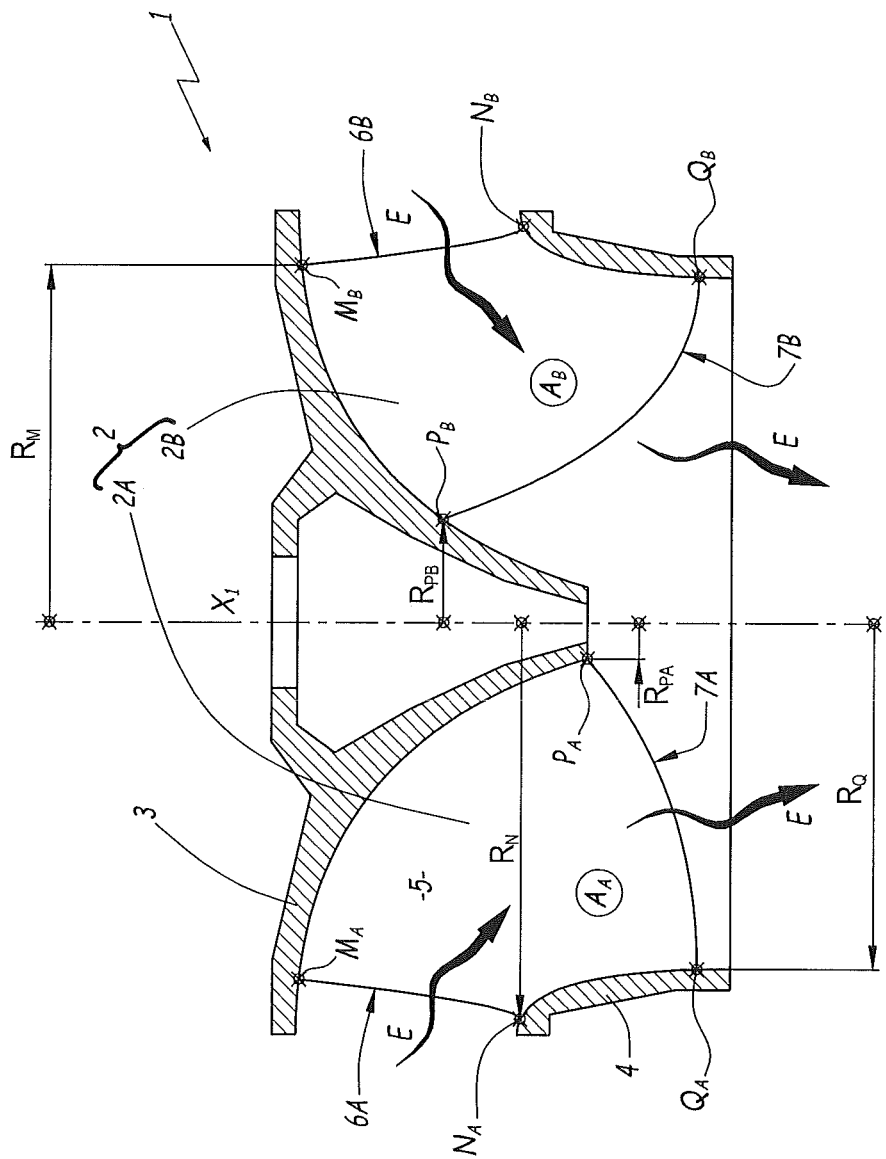
FIG. 3 is a meridian section of the runner of FIG. 2.

As depicted in FIG. 3, the first blades 2A each comprise a leading edge 6A and a trailing edge 7A, whereas the second blades 2B each comprise a leading edge 6B and a trailing edge 7B. The leading edges 6A and 6B and the trailing edges 7A and 7B stretch between the crown 3 and the band 4, with no point of inflexion. The concave face of these edges faces upstream into the flow E over their entire length.

The points of attachment of a leading edge 6A to the crown 3 and to the band 4 are denoted $M_A$ and $N_A$ respectively. The points of attachment of a leading edge 6B to the crown 3 and to the band 4 are denoted $M_B$ and $N_B$ respectively. The leading edges 6A and 6B have the same geometry and the points $M_A$ and $M_B$ of attachment are arranged on one and the same geometric circle centered on the axis $X_1$ and perpendicular to this axis, and the radius of which is denoted $R_N$. Likewise, the points $N_A$ and $N_B$ of attachment are arranged on one and the same circle centered on and perpendicular to the axis $X_1$, and the radius of which is denoted $R_N$.

The points of attachment of a trailing edge 7A to the crown 3 and to the band 4 are denoted $P_A$ and $Q_A$ respectively. The points of attachment of a trailing edge 7B to the crown 3 and to the band 4 are denoted $P_B$ and $Q_B$ respectively. The points $Q_A$ and $Q_B$ of attachment are arranged on one and the same geometric circle $C_Q$ centered on and perpendicular to the axis $X_1$, and the radius of which is denoted $R_Q$.

The points $P_A$ of attachment are situated on one and the same geometric circle $C_{PA}$ centered on and perpendicular to the axis $X_1$, and the radius of which is denoted $R_{PA}$.

The points $P_B$ of attachment are situated on one and the same geometric circle $C_{PB}$ centered on and perpendicular to the axis $X_1$, and the radius of which is denoted $R_{PB}$.

The circles $C_Q$, $C_{PA}$, $C_{PB}$ are visible in FIG. 2, whereas the radii $R_Q$, $R_{PA}$ and $R_{PB}$ are visible in FIG. 3.

The magnitude of the radius $R_{PA}$ is chosen to be less than the magnitude of the radius $R_{PB}$. Thus, a point $P_A$ of attachment of a blade 2A is situated, in relation to a point $P_B$ of attachment of a blade 2B, closer to the axis $X_1$ and lower down in the configuration in which the runner 1 is used. In other words, the first blades 2A have their points $P_A$ of attachment lowered and closer to the axis $X_1$ than the points $P_B$ of attachment of the blades 2B.

The geometry of the blades 2A is such that they guide the flow E into close proximity to the axis $X_1$, thus stabilizing this flow.

It will be noted that the area $A_A$ of a lateral surface of a first blade 2A is greater than the area $A_B$ of a lateral surface of a second blade 2B. In addition, the ratio between the area $A_A$ of a lateral surface of a first blade 2A and the area $A_B$ of a lateral surface of a second blade 2B is chosen so that it is comprised between 1.05 and 1.50 and preferably between 1.20 and 1.50. In practice, the magnitude of this ratio is advantageously of the order of 1.30.

To confer sufficient effectiveness on the first blades 2A of the runner 1, the ratio between the radius $R_{PA}$ and the radius $R_Q$ is chosen to be less than 0.15. In practice, this ratio can be chosen to be less than 0.1 and even less than 0.05.

It is further possible to plan for the ratio between the radii $R_{PA}$ and $R_{PB}$ to be less than 0.75 and preferably comprised between 0.25 and 0.50.

Moreover, the fact that there is an alternation of first blades 2A and second blades 2B as depicted in FIG. 2 makes the operation of welding the blades 2 to the crown 3 easier because, if there were only first blades 2A, the welding operation would be extremely difficult because there would be a great many blades to weld to a small surface area.

Furthermore, the first blades 2A and the second blades 2B are distributed uniformly about the central axis $X_1$ of the runner 1, making it possible to maintain static equilibrium of the runner 1. In FIG. 2, the periodicity of the total number of blades 2 is $2\pi/15$ and the periodicity of the number of first blades 2A is $2\pi/5$. This figure merely shows one possible choice, it would be equally possible to have a periodicity of $2\pi/3$ for the first blades 2A.

As an alternative, the total number of blades may be other than 15, and for example equal to 9, 12, 18 or 24. The distribution between first blades 2A and second blades 2B is then adapted. For example, in the case of a 12-bladed runner, i.e. a runner for which the periodicity of the total number of blades 2 is equal to $2\pi/12$, the periodicity of the number of first blades 2A is equal to $2\pi/3$ or $2\pi/4$.

The periodicity of the number of first blades 2A is chosen to be higher than that of the total number of blades 2, preferably at least twice as high.

The invention claimed is:

1. A Francis-type runner for a turbine, comprising a crown, a band and first blades and second blades, a total number of the first and second blades is not a prime number, the first and second blades extending between the crown and the band and comprising a leading edge, and a trailing edge, each trailing edge having a concave face facing upstream over an entire length, wherein:
    the first blades, uniformly distributed about a central axis of the runner and equal in number to a divisor of the total number of the first and second blades, have a point of attachment of the trailing edge to the crown of the second blades;
    and a first ratio between a radius of a circle centered on and perpendicular to a central axis of the runner and passing through the point of attachment of the trailing edge of the first blades to the crown, and a radius of a circle centered on and perpendicular to the central axis of the runner and passing through the point of attachment of the trailing edge of the first blades to the band, is less than 0.15; and
    wherein a second ratio between the radius of the circle centered on and perpendicular to the central axis of the runner and passing through the point of attachment of the trailing edge of the first blades to the crown and a radius of a circle centered on and perpendicular to the central axis of the runner and passing through the point of attachment of the trailing edge of the second blades to the crown is less than 0.75.

2. The Francis-type runner for a turbine as claimed in claim 1, wherein the first ratio is less than 0.1.

3. The Francis-type runner for a turbine as claimed in claim 1, wherein the points of attachment of the trailing edges to the band of the first and second blades lie on one and the same circle centered on and perpendicular to the central axis of the runner.

4. The Francis-type runner for a turbine as claimed in claim 1, wherein a third ratio between an area of a lateral surface of the first blades and an area of a lateral surface of the second blades is from 1.05 to 1.50.

5. The Francis-type runner for a turbine as claimed in claim 1, wherein a periodicity of the first blades about the central axis is higher than a periodicity of the second blades, and at least twice as high.

6. The Francis-type runner for a turbine as claimed in claim 1, wherein a periodicity of the total number of blades is $2\pi/15$ and a periodicity of the number of first blades is $2\pi/3$ or $2\pi/5$.

7. The Francis-type runner for a turbine as claimed in claim 1, wherein a periodicity of the total number of blades is $2\pi/12$ and a periodicity of the number of first blades is $2\pi/3$ or $2\pi/4$.

8. A plant for converting hydraulic energy into electrical or mechanical energy, comprising a turbine, wherein the turbine comprises a Francis-type runner as claimed in claim 1.

* * * * *